US012810367B2

(12) United States Patent
Morishima et al.

(10) Patent No.: US 12,810,367 B2
(45) Date of Patent: Nov. 24, 2026

(54) INFORMATION PROCESSING APPARATUS, METHOD, AND SYSTEM

(71) Applicant: WOTA CORP., Tokyo (JP)

(72) Inventors: Ryuji Morishima, Tokyo (JP); Shingo Ohki, Tokyo (JP)

(73) Assignee: WOTA CORP., Tokyo (JP)

( * ) Notice: Subject to any disclaimer, the term of this patent is extended or adjusted under 35 U.S.C. 154(b) by 0 days.

(21) Appl. No.: 19/196,124

(22) Filed: May 1, 2025

(65) Prior Publication Data

US 2025/0259252 A1 Aug. 14, 2025

Related U.S. Application Data

(63) Continuation of application No. PCT/JP2023/030274, filed on Aug. 23, 2023.

(30) Foreign Application Priority Data

Nov. 16, 2022 (JP) ................................ 2022-183103

(51) Int. Cl.
*G06Q 50/06* (2024.01)

(52) U.S. Cl.
CPC .................................. *G06Q 50/06* (2013.01)

(58) Field of Classification Search
None
See application file for complete search history.

(56) References Cited

U.S. PATENT DOCUMENTS

| | | | | |
|---|---|---|---|---|
| 2014/0032271 | A1 | 1/2014 | Nordstrand | |
| 2015/0112647 | A1 | 4/2015 | Currin et al. | |
| 2019/0301963 | A1* | 10/2019 | Yoshikawa | G01M 3/00 |
| 2022/0414801 | A1 | 12/2022 | Okudera et al. | |

FOREIGN PATENT DOCUMENTS

| | | | | |
|---|---|---|---|---|
| CN | 114897233 | A * | 8/2022 | G06F 18/23213 |
| JP | 2003278189 | A | 10/2003 | |
| JP | 2004124658 | A | 4/2004 | |
| JP | 2010020707 | A | 1/2010 | |

(Continued)

OTHER PUBLICATIONS

Westphal, “Density and Shrinkage [Dichte und Schrumpfung]”, IÖR Schriffen, Retrieved from the Internet: URL: https://www.ioer.de/fileadmin/internet/IOER_schriften/IOeR_Schriften_Band_49.pdf, XP055300978, Jan. 1, 2008, Band 49, 338 pages (with partial English translation).

(Continued)

*Primary Examiner* — George Chen
(74) *Attorney, Agent, or Firm* — Maier & Maier, PLLC

(57) ABSTRACT

An information processing apparatus includes processing circuitry. The processing circuitry is configured to: divide a target area into meshes of a predetermined order; calculate a population density on a mesh basis based on population data; obtain a sewerage penetration rate of the target area; set the meshes to a first state and then reset meshes to a second state in descending order of the calculated population density until a ratio of a number of meshes in the second state to a total number of meshes reaches the sewerage penetration rate; and estimate a presence/absence of a sewerage service in a mesh based on the first state and the second state.

14 Claims, 8 Drawing Sheets

(56) References Cited

FOREIGN PATENT DOCUMENTS

| | | | |
|---|---|---|---|
| JP | 2011150668 | A | 8/2011 |
| WO | 2021177371 | A1 | 9/2021 |

OTHER PUBLICATIONS

International Search Report issued on Sep. 26, 2023, in corresponding International Application No. PCT/JP2023/030274, 4 pages.

Mosbach et al., "Combined Districting and Main Line Routing—A Method to Implement a Basic Drinking Water Supply Infrastructure in Informal Settlements", Water, Sep. 9, 2022, vol. 14, No. 2805, 21 pages.

* cited by examiner

FIG.3

181

| AREA INFORMATION TABLE 181 | | | | | | | |
|---|---|---|---|---|---|---|---|
| MESH NUMBER | POPULATION | POPULATION DENSITY | WATER SUPPLY SERVICE | SEWERAGE SERVICE | ZONE | EXTENSION OF PIPING | COST ADVANTAGE |
| M1 | P1 | D1 | B | 1 | 2 | L1 | C1 |
| M2 | P2 | D2 | A | 1 | 3 | L2 | C2 |
| M3 | P3 | D3 | B | 2 | 1 | L3 | C3 |
| ... | ... | ... | ... | ... | ... | ... | ... |

| | WITHIN WATER SUPPLY SERVICE ZONE | OUTSIDE WATER SUPPLY SERVICE ZONE |
|---|---|---|
| WITHIN SEWERAGE SERVICE ZONE | FIRST ZONE | NOT EXIST IN PRINCIPLE |
| OUTSIDE SEWERAGE SERVICE ZONE | SECOND ZONE | THIRD ZONE |

INFORMATION PROCESSING APPARATUS, METHOD, AND SYSTEM

This application is based upon and claims the benefit of priority from the prior Japanese Patent Application No. 2022-183103, filed Nov. 16, 2022 and from PCT Patent Application No. PCT/JP2023/30274, filed Aug. 23, 2023, the entire contents of which are incorporated herein by reference.

FIELD

Embodiments described herein relate generally to an information processing apparatus, a method, and a system.

BACKGROUND

A pipeline network simulation device has been proposed which uses edge information detected from a map by image processing.

In the conventional apparatus, the population density is estimated based on a map image, and the pipeline network simulation is performed based on the estimated population density. In the conventional apparatus, however, it is necessary to obtain a map image and discern an inhabited house in the map image, and the processing is complicated.

An object of the present disclosure is to estimate the waterworks environment of a target area based on published information with reduced processing load.

BRIEF DESCRIPTION OF THE DRAWINGS

FIG. 3 is a diagram showing a data structure of an area information table 181 stored in the information processing apparatus 10.

DETAILED DESCRIPTION

Figure 1:
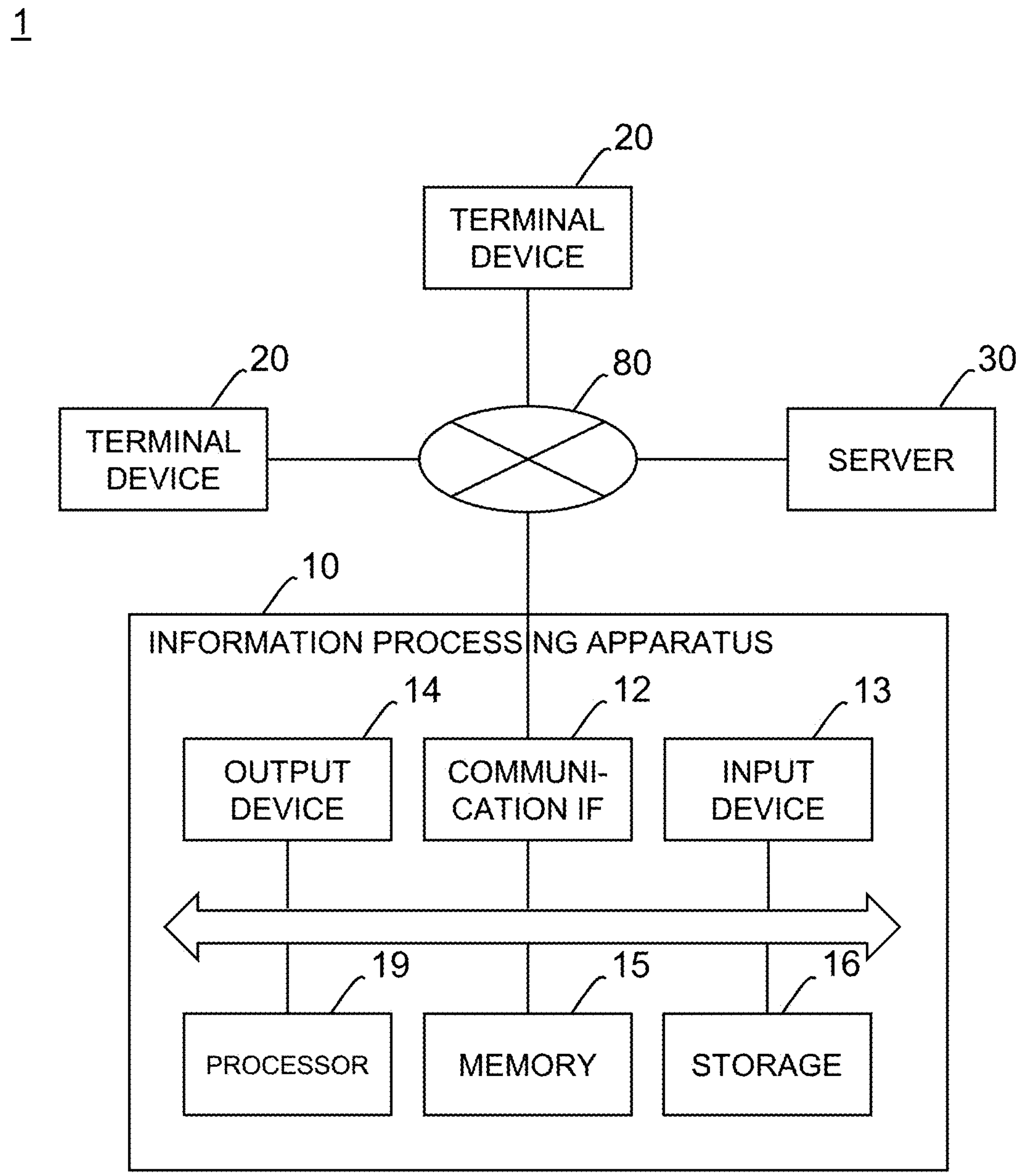
FIG. 1 is a block diagram showing an example of a general configuration of a system 1.

In general, according to an embodiment, an information processing apparatus includes processing circuitry. The processing circuitry is configured to: divide a target area into meshes of a predetermined order; calculate a population density on a mesh basis based on population data; obtain a sewerage penetration rate of the target area; set the meshes to a first state and then reset meshes to a second state in descending order of the calculated population density until a ratio of a number of meshes in the second state to a total number of meshes reaches the sewerage penetration rate; and estimate a presence/absence of a sewerage service in a mesh based on the first state and the second state.

In the following, an embodiment of the present disclosure will be described. In the description below, the same components are denoted by the same reference numerals. Those components also have the same names and functions. Therefore, detailed descriptions thereof will not be repeated.

Overview

An information processing apparatus according to this embodiment divides a target area for simulation into meshes of a predetermined order (such as MESH4) and estimates the water supply and sewerage environment of mesh regions based on population data for each mesh, data about the water supply zone of the water supply service or small-scale water supply services, and data about the sewerage penetration rate. Based on the estimated environment, the information processing apparatus simulates the cost advantage of substituting a large-scale centralized infrastructure for water treatment (water supply and sewerage systems) with a distributed infrastructure for water treatment on a mesh basis. The information processing apparatus presents the simulation result to a user.

In this embodiment, the large-scale centralized infrastructure for water treatment is an infrastructure for water treatment that is built in units of cities and takes several decades for development and investment recovery. The large-scale centralized infrastructure for water treatment includes a water treatment facility and a sewage treatment facility, for example. The water treatment facility is a facility that supplies tap water and includes a water purification plant and water piping that distributes tap water to consumers, for example. The sewage treatment facility is a facility that purifies wastewater from consumers and includes a sewage treatment plant and sewage piping that feeds sewage to the sewage treatment plant, for example.

In this embodiment, the distributed infrastructure for water treatment is an infrastructure for water treatment that is built in units of persons (houses) and takes one day for development and several years for amortization like household electric appliances. The distributed infrastructure is a small water circulation system (which may be referred to as a treatment unit), for example.

The water circulation system is a device that reclaims water from domestic wastewater in each house, for example. The reclaimed water can be used as domestic water for toilet cleaning, bathing, showering, laundry washing, dish washing or the like. The reclaimed water can also be used as drinking water. The water circulation system basically discharges no wastewater and produces a little redundant water. The redundant water can be discharged to nature in terms of quality. That is, if the water circulation system is installed, the need for the sewage treatment facility or water purification tank currently used is eliminated. However, the water circulation system may be used in combination with the existing sewage treatment facility or water purification tank in order to reduce the load thereon. Furthermore, the water circulation system filters rainwater, surface water, ground water or the like to produce domestic water or drinking water. That is, if the water circulation system is installed, the need for the water treatment facility can be eliminated.

The water circulation system includes a treatment tank module that is a compact set of a regulating tank, a biological treatment tank and a water storage tank that treats and purifies wastewater (such as domestic water and sewage) from consumers, for example. The distributed infrastructure further includes a filtration unit that has a physical filter, such as a reverse osmosis membrane, a nanofiltration membrane, an ultrafiltration membrane or a microfiltration membrane, as well as a chemical filter, such as a biological filter, activated carbon, zeolite or ion exchange resin, for example. The filtration unit filters water taken from a predetermined water source, for example. The filtration unit also filters water treated in the treatment tank module, for example. The distributed infrastructure further includes an UV sterilization unit that sterilizes water to be provided, for example. The distributed infrastructure further includes an ozone generator, for example. The ozone generator generates ozone gas for deodorization of the treatment tank module, sterilization of water in the treatment tank module or decolorization of water in the treatment tank module, for example. The distributed infrastructure further includes a sensor unit that detects various physical properties in the treatment tank module, for example.

Note that the water circulation system is not limited to a system that discharges no wastewater and may be a system that discharges a reduced amount of wastewater. That is, in this embodiment, even if the water circulation system is introduced, the need for the sewage treatment facility, the water purification tank and the water treatment facility is not necessarily eliminated.

<1. General Configuration Diagram of System>

FIG. 1 is a block diagram showing an example of a general configuration of a system 1. The system 1 shown in FIG. 1 includes an information processing apparatus 10, a terminal device 20 and a server 30, for example. The information processing apparatus 10, the terminal device 20 and the server 30 are communicatively connected to each other via a network 80, for example.

Although FIG. 1 shows an example in which the system 1 includes two terminal devices 20, the number of terminal devices 20 included in the system 1 is not limited to two. The terminal device 20 is a terminal that obtains information for estimating the water supply and sewerage environment of a mesh region, for example. The system 1 may include less than two terminal devices 20 or three or more terminal devices 20.

In this embodiment, a set of a plurality of devices may form one server. The way of assigning a plurality of functions required for implementing the server 30 according to this embodiment to one or more pieces of hardware can be appropriately determined in view of the processing capacity of each piece of hardware and/or the specifications required for the server 30, for example.

The information processing apparatus 10 shown in FIG. 1 is an information processing apparatus that is operated by a user to estimate the water supply and sewerage environment of a mesh region. The information processing apparatus 10 is also an information processing apparatus that is operated by the user to simulate the cost advantage of substituting a distributed infrastructure for water treatment for the large-scale centralized infrastructure for water treatment. The information processing apparatus 10 is implemented by a desktop personal computer (PC) or a laptop PC, for example. The information processing apparatus 10 may be a portable terminal, such as a smartphone or a tablet.

The information processing apparatus 10 includes a communication interface (IF) 12, an input device 13, an output device 14, a memory 15, a storage 16 and processing circuitry 19. The input device 13 is a device for receiving an input operation from the user (such as a touch panel, a touch pad, a pointing device such as a mouse, or a keyboard). The output device 14 is a device for presenting information to the user (such as a display or a speaker).

The terminal device 20 is an information processing apparatus that obtains information for estimating the water supply and sewerage environment of a mesh region, for example. The terminal device 20 provides the server 30 with information from which predetermined information in a mesh region can be obtained in real time. The terminal device 20 is implemented by an on-board terminal of a car navigation system, for example. When the terminal device 20 is an on-board terminal, the terminal device 20 provides the server 30 with driving information obtained using a satellite positioning system, for example.

Alternatively, the terminal device 20 is implemented by a portable terminal carried by a resident, for example. When the terminal device 20 is a portable terminal, the terminal device 20 provides the server 30 with information about the position of the device obtained using a satellite positioning system, for example. When the terminal device 20 is a portable terminal, the terminal device 20 may obtain the position of the device using the position of a radio base station to which the terminal device 20 connects, for example.

The server 30 is an information processing apparatus that accumulates information for estimating the water supply and sewerage environment of a mesh region, for example. The server 30 stores predetermined public information, for example. In this embodiment, the public information means public information that can be accessed by anyone at any time, for example. The public information includes information about a population, for example. The public information includes information about water treatment facilities, for example. The public information includes information about sewage treatment facilities, for example. The public information includes information about road length, for example. The public information includes other map information, including a radio station map and radio station information, a power transmission line map and power transmission line information, topography information, and river, lake and pond information.

Specifically, the information about a population includes population data by prefecture in the form of meshes of a predetermined order (such as MESH4) published by Ministry of Land, Infrastructure, Transport and Tourism. Furthermore, the information about water treatment facilities includes GIS polygon data about the water supply zone of the water supply service or small-scale water supply services provided in the water supply facility data from Ministry of Land, Infrastructure, Transport and Tourism, for example. Furthermore, the information about sewage treatment facilities includes the sewerage penetration rate by municipality published by JAPAN SEWAGE WORKS ASSOCIATION, for example. Furthermore, the information about a road length include road length data in the form of meshes of a predetermined order published by Ministry of Land, Infrastructure, Transport and Tourism, for example. The road length data is used for estimating the extension of the water and sewage piping, for example.

The extension of the water and sewage piping may be estimated from an average distance between houses. The average distance between houses is estimated on the assumption that houses are randomly distributed in a mesh. Alternatively, the extension of the water and sewage piping may be estimated from the information about water and sewerage facilities. The information about water and sewerage facilities includes scales and treatment capacities of water and sewerage facilities and distances between the facilities, for example. For example, the range of houses covered by water and sewerage facilities is estimated based on the scales and treatment capacities of the water and sewage treatment facilities, and the extension of the water and sewage piping is estimated based on the estimated range.

The server 30 stores information obtained based on information provided by the terminal device 20, for example. Specifically, the server 30 obtains predetermined information in a mesh region in real time based on information provided by the terminal device 20. More specifically, when the terminal device 20 is an on-board terminal, the server 30 obtains road information based on driving information provided by the terminal device 20, for example. When the terminal device 20 is a portable terminal, the server 30 obtains population information based on information about the position of the portable terminal provided by the terminal device 20, for example.

In response to a request from the information processing apparatus 10, the server 30 provides the information processing apparatus 10 with information requested by the information processing apparatus 10.

Each information processing apparatus is formed by a computer that includes an arithmetic device and a storage device. A basic hardware configuration of the computer and a basic functional configuration of the computer implemented by the hardware configuration will be described later. The information processing apparatus 10, the terminal device 20 and the server 30 will be described by avoiding redundant description of the same parts as those of the basic hardware configuration and basic functional configuration of the computer described later.

<1.1 Configuration of Terminal Device>

Figure 2:
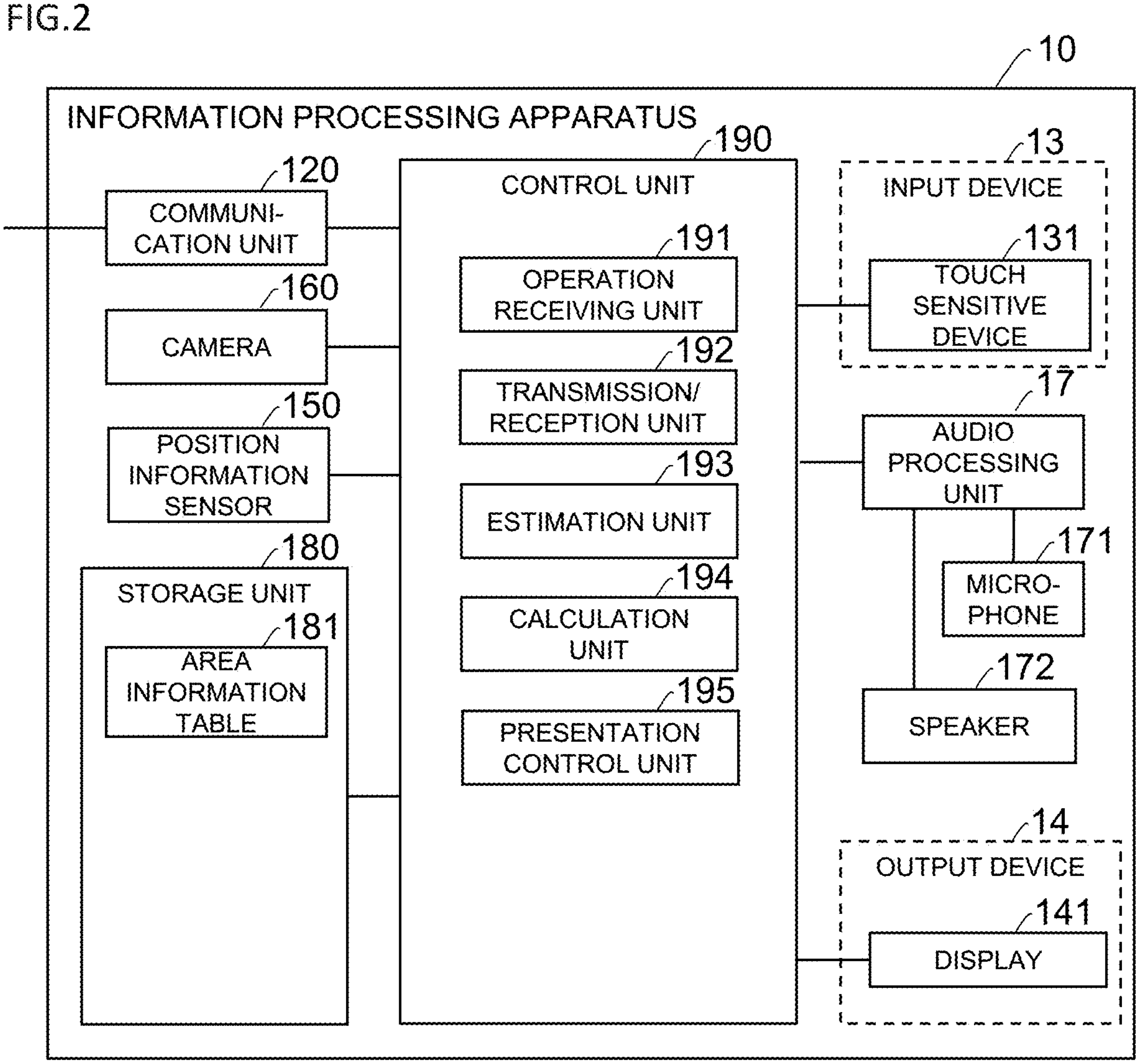
FIG. 2 is a block diagram showing an example configuration of an information processing apparatus 10 shown in FIG. 1.

FIG. 2 is a block diagram showing an example configuration of the information processing apparatus 10 shown in FIG. 1. As shown in FIG. 2, the information processing apparatus 10 includes a communication unit 120, the input device 13, the output device 14, an audio processing unit 17, a microphone 171, a speaker 172, a camera 160, a position information sensor 150, a storage unit 180 and a controller 190. The blocks included in the information processing apparatus 10 are electrically connected to each other by a bus or the like, for example.

The communication unit 120 performs processing, such as modulation and demodulation processing, that allows the information processing apparatus 10 to communicate with another device. The communication unit 120 performs transmission processing on a signal generated by the controller 190 and transmits the signal to the outside (the server 30, for example). The communication unit 120 performs reception processing on a signal received from the outside and outputs the signal to the controller 190.

The input device 13 is a device to which an instruction or information is input by the user who is operating the information processing apparatus 10. The input device 13 is implemented by a touch sensitive device 131 or the like to which an instruction is input through touch on an operation screen, for example. When the information processing apparatus 10 is a PC, the input device 13 may be implemented by a reader, a keyboard, or a mouse, for example. The input device 13 converts an instruction input by the user into an electric signal and outputs the electric signal to the controller 190. Note that the input device 13 may include a receiving port that receives an electric signal input from external input equipment, for example.

The output device 14 is a device that presents information to the user who is operating the information processing apparatus 10. The output device 14 is implemented by a display 141 or the like, for example. The display 141 displays data under the control of the controller 190. The display 141 is implemented by a liquid crystal display (LCD), an organic electro-luminescence (EL) display or the like, for example.

The audio processing unit 17 performs digital-to-analog conversion processing on an audio signal, for example. The audio processing unit 17 converts a signal provided by the microphone 171 into a digital signal and provides the converted signal to the controller 190. Furthermore, the audio processing unit 17 provides an audio signal to the speaker 172. The audio processing unit 17 is implemented by processing circuitry for audio processing, for example. The microphone 171 receives an audio input and provides an audio signal corresponding to the audio input to the audio processing unit 17. The speaker 172 converts an audio signal provided by the audio processing unit 17 into a sound and outputs the sound to the outside of the information processing apparatus 10.

The camera 160 is a device that receives light at a light receiving element and outputs an image signal based on the light.

The position information sensor 150 is a sensor that detects the position of the information processing apparatus 10 and is a global positioning system (GPS) module, for example. The GPS module is a receiving device used in the satellite positioning system. In the satellite positioning system, the GPS module receives signals from at least three or four satellites and detects the current position of the information processing apparatus 10 in which the GPS module is incorporated based on the received signals. The position information sensor 150 may detect the current position of the information processing apparatus 10 based on the position of a radio base station to which the information processing apparatus 10 connects.

The storage unit 180 is implemented by the memory 15, the storage 16 or the like, for example, and stores data and a program used by the information processing apparatus 10. The storage unit 180 stores an area information table 181, for example.

The area information table 181 is a table that stores information about a mesh region. The area information table 181 will be described in detail later.

The controller 190 is implemented by the processing circuitry 19 reading a program stored in the storage unit 180 and executing an instruction included in the program. The controller 190 controls an operation of the information processing apparatus 10. By operating according to the program, the controller 190 performs the functions of an operation receiving unit 191, a transmission/reception unit 192, an estimation unit 193, a calculation unit 194 and a presentation control unit 195.

The operation receiving unit 192 performs processing for receiving an instruction or information input from the input device 13. Specifically, for example, the operation receiving unit 191 receives an instruction or information input from the touch sensitive device 131 or the like.

Furthermore, the operation receiving unit 191 receives an audio instruction input from the microphone 171. Specifically, for example, the operation receiving unit 191 receives an audio signal input from the microphone 171 and converted into a digital signal by the audio processing unit 17. The operation receiving unit 191 obtains the instruction from the user by analyzing the received audio signal to extract a predetermined noun.

The transmission/reception unit 192 performs processing that allows the information processing apparatus 10 to transmit and receive data to and from an external device, such as the server 30, according to a communication protocol. Specifically, for example, the transmission/reception unit 192 transmits a request input by the user to the server 30. Furthermore, the transmission/reception unit 192 receives information provided by the server 30.

The estimation unit 193 estimates the water supply and sewerage environment for each mesh region obtained by dividing a simulation target area. Specifically, for example, the estimation unit 193 divides a target area into meshes of a predetermined order (such as MESH4). The estimation unit 193 obtains population data for each mesh stored concerning the target area from the server 30. Based on the population data for each mesh, the estimation unit 193 calculates the population density for each mesh. When the population density for each mesh can be externally obtained, the population density does not need to be calculated.

The estimation unit 193 obtains the sewerage penetration rate of the target area from the server 30. The estimation unit 193 sets the state of the mesh region to a first state or a second state. The first state represents a region where the there is no sewerage service. The second state represents a region where there is a sewerage service. The estimation unit 193 sets the state of the mesh region to the first state or the second state so that the ratio of the number of the mesh regions in the second state to the total number of the mesh regions agrees with the sewerage penetration rate.

The estimation unit 193 estimates that a mesh region in the first state is a zone where there is no sewerage service and a mesh region in the second state is a zone where there is a sewerage service.

Furthermore, the estimation unit 193 obtains, from the server 30, data about the water supply zone of the water treatment facility in the target area. The estimation unit 193 sets a mesh that does not correspond to the water supply zone to a state A. The state A represents a region where there is no water supply service. The estimation unit 193 sets a mesh that corresponds to the water supply zone to a state B. The state B represents a region where there is a water supply service.

The estimation unit 193 determines a mesh region in the state A to be a zone where there is no water supply service, and determines a mesh region in the state B to be a zone where there is a water supply service. The estimation unit 193 estimates a mesh region that is in the second state and in the state B to be a first zone. The first zone represents a zone where there are both water supply and sewerage services. The estimation unit 193 estimates a mesh region that is in the first state and in the state B to be a second zone. The second zone represents a zone where there is a water supply service but the there is no sewerage service. The estimation unit 193 estimates a mesh region that is in the first state and in the state A to be a third zone. The third zone represents a zone where there is neither a water supply service nor a sewerage service.

Note that although extremely rare, there is a zone where there is no water supply service but there is a sewerage service. In this embodiment, however, it is assumed that there is no such zone in principle.

The calculation unit 194 calculates, on a mesh region basis, the cost advantage in the case where the existing infrastructure is substituted with the distributed infrastructure for water treatment. Specifically, for example, the calculation unit 194 calculates the reduction in cost achieved by introduction of the distributed infrastructure for each estimated zone, based on the expenses in the case where a house in the surroundings is incorporated into a section where there are water supply and sewerage services (referred to shortly as a service section, hereinafter) and the expenses in the case where a house in the surroundings is not incorporated into a service section and the distributed infrastructure is used.

More specifically, for example, the calculation unit 194 calculates a critical distance between houses based on the expenses in the case where a house in the surroundings is incorporated into a service section and the expenses in the case where a house in the surroundings is not incorporated in a service section and the distributed infrastructure is used. In this embodiment, the critical distance between houses represents the distance at which the expenses required to incorporate a house in the surroundings into a service section and the expenses for using the distributed infrastructure are equal. That is, the cost of the distributed infrastructure is cheaper when the distance between houses is greater than the critical distance, and the cost of the existing service is cheaper when the distance between houses is smaller than the critical distance.

Even more specifically, for example, the calculation unit 194 calculates the critical distance between houses for a mesh region that is the first zone, based on the expenses in the case where a house in the surroundings is incorporated into the water supply service and the sewerage service and the expenses in the case where a house in the surroundings is not incorporated into the water supply service and the sewerage service and the distributed infrastructure is used.

Alternatively, for example, the calculation unit 194 calculates the critical distance between houses for a mesh region that is the first zone, based on the expenses in the case where a house in the surroundings is incorporated into the water supply service and the sewerage service and the expenses in the case where a house in the surroundings is incorporated into the water supply service but is not incorporated into the sewerage service and the distributed infrastructure is used.

Alternatively, for example, the calculation unit 194 calculates the critical distance between houses for a mesh region that is the second zone, based on the expenses in the case where a house in the surroundings is incorporated into the water supply service and is equipped with a water purification tank and the expenses in the case where a house in the surroundings is neither incorporated into the water supply service nor equipped with a water purification tank and the distributed infrastructure is used.

In the third zone, instead of the water treatment facility, dedicated waterworks using ground water and surface water or small private waterworks can be used. The expenses for installing and maintaining the dedicated waterworks or small private waterworks vary for various reasons, and in this embodiment, the expenses for installation and maintenance are estimated to be approximately equal to those for the water treatment facility. That is, for the third zone, as with the second zone, for example, the calculation unit 194 calculates the critical distance between houses based on the expenses in the case where a house in the surroundings is incorporated into the water supply service and is equipped with a water purification tank and the expenses in the case where a house in the surroundings is neither incorporated into the water supply service nor equipped with a water purification tank and the distributed infrastructure is used.

The calculation unit 194 calculates the reduction in cost achieved by introduction of the distributed infrastructure, based on the difference between the calculated critical distance and the estimated extension of piping in the mesh. For example, the calculation unit 194 calculates the extension of piping as follows. The calculation unit 194 calculates the extension of roads in the mesh based on road length data, for example. The calculates 194 regards the extension of roads as the extension of water and sewage piping. The calculation unit 194 calculates the reduction in cost achieved by introduction of the distributed infrastructure for all the mesh regions in the target area.

The calculation unit 194 may calculate not only the cost in the case where the distributed infrastructure is installed for each consumer but also the cost in the case where the distributed infrastructure is shared by a plurality of consumers. Specifically, for example, the calculation unit 194 calculates the reduction in cost achieved by introduction of the distributed infrastructure for each estimated zone, based on the expenses in the case where a plurality of houses in the surroundings are incorporated into a service section and the expenses in the case where a plurality of houses in the surroundings are not incorporated into the service section and the distributed infrastructure is used and shared by the houses.

More specifically, for example, the calculation unit 194 calculates the critical distance between houses based on the expenses in the case where a plurality of houses in the surroundings are incorporated into a service section and the expenses in the case where a plurality of houses in the surroundings are not incorporated into the service section and the distributed infrastructure is used and shared by the houses.

Even more specifically, for example, the calculation unit 194 calculates the critical distanced between houses for a mesh region that is the first zone, based on the expenses in the case where a plurality of houses in the surroundings are incorporated into the water supply service and the sewerage service and the expenses in the case where a plurality of houses in the surroundings are not incorporated into the water supply service and the sewerage service and the distributed infrastructure is used and shared by the houses.

Alternatively, for example, the calculation unit 194 calculates the critical distance between houses for a mesh region that is the first zone, based on the expenses in the case where a plurality of houses in the surroundings are incorporated into the water supply service and the sewerage service and the expenses in the case where a plurality of houses in the surroundings are incorporated into the water supply service but are not incorporated into the sewerage service and the distributed infrastructure is used and shared by the houses.

Alternatively, for example, the calculation unit 194 calculates the critical distance between houses for a mesh region that is the second zone, based on the expenses in the case where a plurality of houses in the surroundings are incorporated into the water supply service and a plurality of houses are equipped with a water purification tank and the expenses in the case where a plurality of houses in the surroundings are neither incorporated into the water supply service nor equipped with a water purification tank and the distributed infrastructure is used and shared by the houses.

The calculation unit 194 calculates the reduction in cost achieved by introduction of the distributed infrastructure, based on the difference between the calculated critical distance and the estimated extension of piping in the mesh.

The presentation control unit 195 controls the output device 14 to present the simulation result to the user. Specifically, the presentation control unit 195 displays meshes of the target area on the display 141 in such a manner that the calculated reduction in cost can be discerned.

<2. Data Structure>

FIG. 3 is a diagram showing a data structure of the area information table 181 stored in the information processing apparatus 10. Note that FIG. 3 shows an example, and data that is not listed in FIG. 3 may be included. Furthermore, pieces of data included in the same table may be stored in separate storage regions in the storage unit 180.

The area information table 181 shown in FIG. 3 is a table including columns of population, population density, water supply service, sewerage service, zone, extension of piping, and cost advantage, in which mesh numbers are used as sort keys.

The mesh number is an item that stores a number that uniquely identifies a mesh. The population is an item that stores the population of a relevant mesh. The item "population" stores the population of each mesh obtained from the server 30. The population density is an item that stores the density of the population in a relevant mesh. The item "population density" stores the population density calculated based on the population, for example.

The water supply service is an item that stores a state that indicates whether there is a water supply service. The item "water supply service" stores "A", which indicates a region where there is no water supply service, or "B", which indicates a region where there is a water supply service. Note that the characters that indicate states are not limited to A and B, and other characters may be used, or numerals or symbols may also be used. The sewerage service is an item that stores a state that indicates whether there is a sewerage service. The item "sewerage service" stores "1", which indicates a region where there is no sewerage service, or "2", which indicates a region where there is a sewerage service. Note that the numerals that indicate states are not limited to 1 and 2, and other numerals may be used, or characters or symbols may also be used.

The zone is an item that stores a zone to which a mesh region is estimated to belong. The item "zone" is set to any of 1 to 4 according to whether there are water supply and sewerage services. The zone is set based on the state of the water supply service and the state of the sewerage service. Note that the numerals that indicate zones are not limited to 1 to 4, and other numerals may be used, or characters or symbols may also be used. The extension of piping is an item that stores the length of piping per house in a mesh region. The item "extension of piping" stores the extension of piping estimated based on the road length data, for example. The cost advantage is an item that stores a variation in cost caused by switching from the existing service to the distributed infrastructure in a relevant mesh.

The item "cost advantage" stores the reduction in cost calculated by the calculation unit 194, for example.

<3. Operation>

An operation of the information processing apparatus 10 for estimating the water supply and sewerage environment for each mesh in a target area and simulating the cost advantage of the distributed infrastructure will be described.

Figure 4:
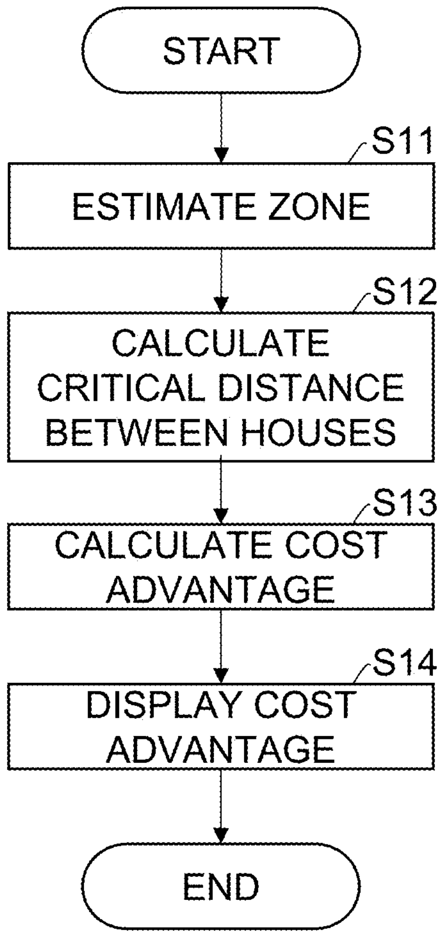
FIG. 4 is a flowchart showing an example of an operation of the information processing apparatus 10 for performing simulation for a target area.

FIG. 4 is a flowchart showing an example of an operation of the information processing apparatus 10 for performing simulation for a target area.

When simulating the cost advantage of the distributed infrastructure for a predetermined area, the user first specifies a target area. The user specifies a target area and inputs a simulation execution instruction to the information processing apparatus 10.

In step S11, the information processing apparatus 10 estimates a zone involved with the service of the water and sewage treatment facilities in the target area. Specifically, the controller 190 of the information processing apparatus 10 makes the estimation unit 193 divide the target area into meshes of a predetermined order (such as MESH4). The estimation unit 193 obtains, from the server 30, the population data for each mesh stored for the target area. The estimation unit 193 calculates the population density of each mesh based on the population data for the mesh.

The estimation unit 193 obtains, from the server 30, the sewerage penetration rate of the target area. The estimation unit 193 sets the state of the mesh regions to the first state or the second state. Specifically, the estimation unit 193 sets all the mesh regions in the target area to the first state. It is assumed that there is a sewerage service in regions having higher population densities in each municipality. The estimation unit 193 switches the state of mesh regions from the first state to the second state in descending order of population density. The state of mesh regions are switched from the first state to the second state until the ratio of the number of mesh regions that are in the second state to the total number of mesh regions agrees with the sewerage penetration rate.

The estimation unit 193 obtains, from the server 30, data about the water supply zone of the water treatment facility in the target area. The estimation unit 193 sets a mesh that does not correspond to the water supply zone to the state A. The estimation unit 193 sets a mesh that corresponds to the water supply zone to the state B.

The estimation unit 193 estimates the mesh regions that are in the second state and in the state B to be the first zone, which is the zone where there are both water supply and sewerage services. The estimation unit 193 estimates the mesh regions that are in the first state and in the state B to be the second zone, which is the zone where there is a water supply service but there is no sewerage service. The estimation unit 193 estimates the mesh regions that are in the first state and in the state A to be the third zone, which is the zone where there is neither a water supply service nor a sewerage service.

Figure 5:
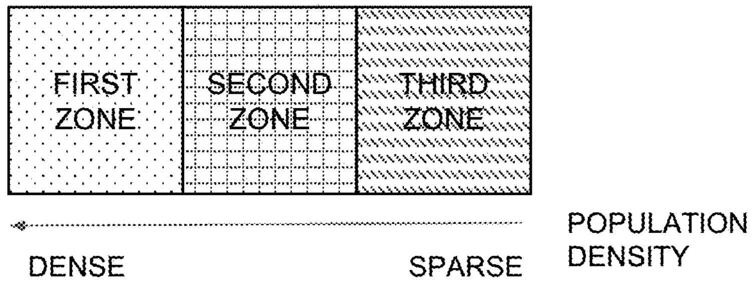
FIG. 5 is a diagram for illustrating zones estimated for mesh regions.

FIG. 5 is a diagram for illustrating zones estimated for mesh regions. In FIG. 5, the population density in the mesh is estimated to be the highest in the first zone, the second highest in the second zone, and the lowest in the third zone.

In step S12, the information processing apparatus 10 calculates the critical distance between houses.

Figure 6:
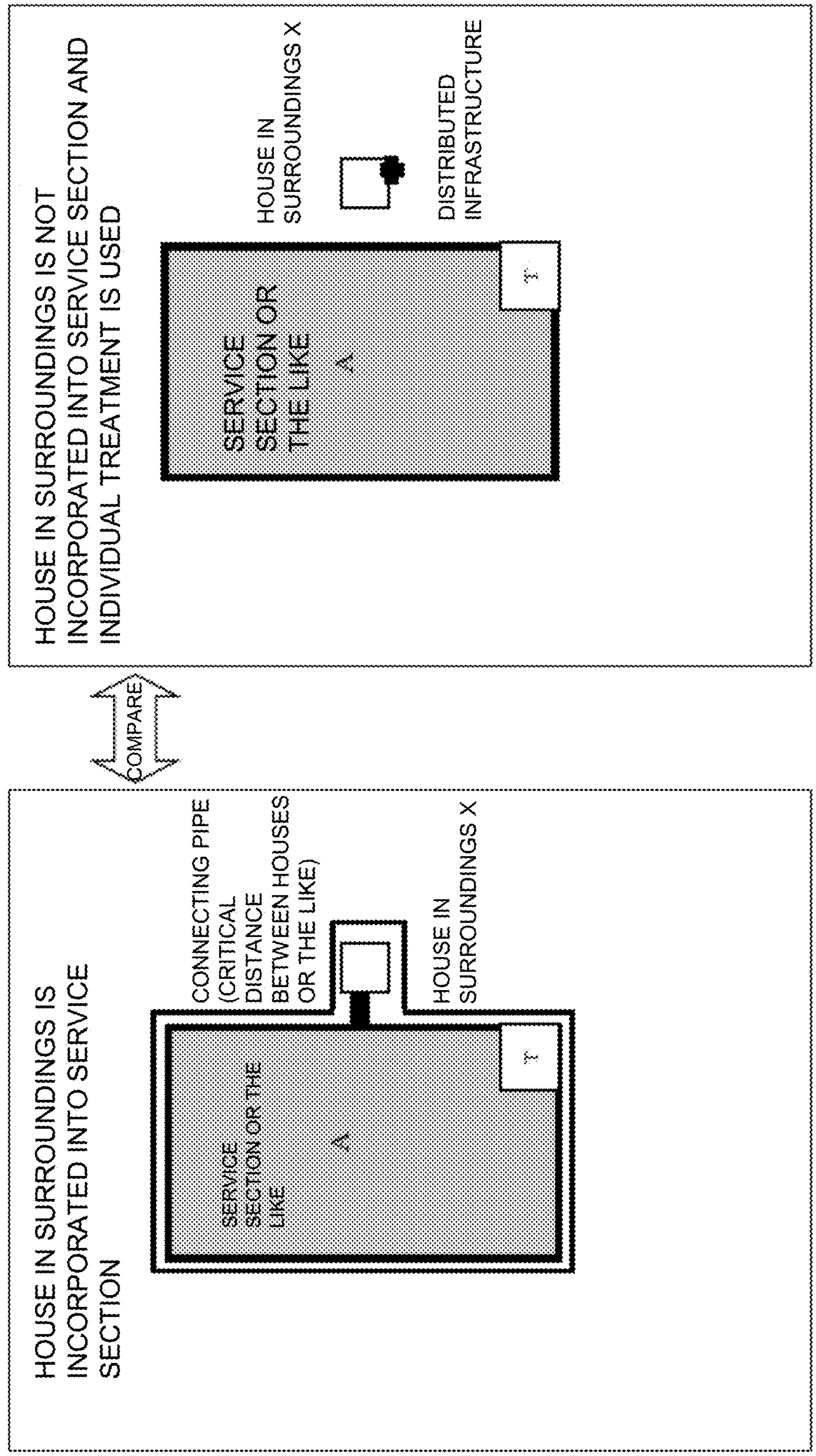
FIG. 6 is a diagram for illustrating processing of calculating a critical distance between houses.

FIG. 6 is a diagram for illustrating processing of calculating the critical distance between houses.

Specifically, the controller 190 makes the calculation unit 194 calculate the critical distance between houses in the mesh region that is the first zone, based on the expenses in the case where a house in the surroundings is incorporated into the water supply service and the sewerage service and the expenses in the case where a house in the surroundings is not incorporated into the water supply service and the sewerage service and the distributed infrastructure is used.

The calculation unit 194 calculates the expenses in the case where a house in the surroundings is not incorporated into the water supply service and the sewerage service and the distributed infrastructure is used as follows, for example.

$$C_S(X)+M_S(X)+C_W(Y-y)+M_W(Y-y)+C_U+M_U \quad \text{formula (1)}$$

In the formula (1), X denotes the scale of a wastewater treatment plant ($m^3$/day). $C_S$ denotes the construction cost of a sewage treatment plant per year (ten thousand yen/year) on the assumption that the amortization period is set to a predetermined number of years. $M_S$ denotes the operation and maintenance cost of a sewage treatment plant (ten thousand yen/year). Y denotes the scale of a water purification plant ($m^3$/day). y denotes the amount of water savings per household ($m^3$/day) in the case where the distributed infrastructure is used. $C_W$ denotes the construction cost of a water purification plant per year (ten thousand yen/year) on the assumption that the amortization period is set to a predetermined number of years. $M_W$ denotes the operation and maintenance cost of a water purification plant (ten thousand yen/year). $C_W$ denotes the construction cost of the distributed infrastructure per year (ten thousand yen/year/household) on the assumption that the service life is set to a predetermined number of years. For example, $C_W$ may be set to be k times the construction cost of a water purification tank per year on the assumption that the service life is set to a predetermined number of years. $M_U$ denotes the operation and maintenance cost of a water purification tank (ten thousand yen/year). For example, $M_U$ may be set to be k times the operation and maintenance cost of a water purification tank.

Furthermore, the calculation unit 194 calculates the expenses in the case where a house in the surroundings is incorporated into the water supply service and the sewerage service as follows, for example.

$$C_S(X+x)+M_S(X+x)+C_W(Y)+M_W(Y)+C_{PS}(L_S)+C_{PW}(L_W)+M_{PS}(L_S)+M_{PW}(L_W) \quad \text{formula (2)}$$

In the formula (2), x denotes the daily maximum amount of wastewater per household ($m^3$/day). $C_{PS}$ denotes the construction cost of sewage piping per year (ten thousand yen/year) on the assumption that the amortization period is set to a predetermined number of years and the extension of the sewage piping is $L_S$ (m). $C_{PW}$ denotes the construction cost of water piping per year (ten thousand yen/year) on the assumption that the amortization period is set to a predetermined number of years and the extension of the water piping is $L_W$ (m). $M_{PS}$ denotes the operation and maintenance cost of sewage piping having an extension of $L_S$ (m) (ten thousand yen/year). $M_{PW}$ denotes the operation and maintenance cost of water piping having an extension of $L_W$ (m) (ten thousand yen/year).

When the formula (1) equals to the formula (2), the calculation unit 194 calculates a critical distance $L_1$ between houses by making the substitution: $L_S=L_W=L_1$.

When the amount of water usage can be saved (it is assumed that the amount of water usage is 0 for the sake of simplicity) although the connection between the house and the water treatment facility is maintained, the critical distance between houses is determined by not considering the piping cost ($C_{PW}+M_{PW}$) of the water piping in the formula (2). This is equivalent to saying that, for a mesh region that is the first zone, the calculation unit 194 calculates the critical distance between houses based on the expenses in the case where the house in the surroundings is incorporated into the water supply service and the sewerage service and the expenses in the case where the house in the surroundings is incorporated into the water supply service but is not incorporated into the sewerage service and the distributed infrastructure is used.

For a mesh region that is the second zone, the calculation unit 194 calculates the critical distance between houses based on the expenses in the case where the house in the surroundings is incorporated into the water supply service and is equipped with a water purification tank and the expenses in the case where the house in the surroundings is neither incorporated into the water supply service nor equipped with a water purification tank and the distributed infrastructure is used.

The calculation unit 194 calculates the expenses in the case where the house in the surroundings is neither incorporated into the water supply service nor equipped with a water purification tank and the distributed infrastructure is used as follows, for example.

$$C_W(Y-y)+M_W(Y-y)+C_W+M_U \quad \text{formula (3)}$$

The calculation unit 194 calculates the expenses in the case where the house in the surroundings is incorporated into the water supply service and equipped with a water purification tank as follows, for example.

$$C_W(Y)+M_W(Y)+C_J+C_{PW}(L_W)+M_J+M_{PW}(L_W) \quad \text{formula (4)}$$

In the formula (4), $C_J$ denotes the construction cost of a water purification tank per year (ten thousand yen/year/household) on the assumption that the amortization period is set to a predetermined number of years. $M_J$ denotes the operation and maintenance cost of a water purification tank (ten thousand yen/year/household).

When the formula (3) equals to the formula (4), the calculation unit 194 calculates a critical distance $L_2$ between houses by making the substitution: $L_W=L_2$.

In step S13, the information processing apparatus 10 calculates the reduction in cost achieved by introduction of the distributed infrastructure based on the difference between the calculated critical distance and the extension of piping estimated in the mesh. Specifically, the calculation unit 194 calculates the extension of roads in the mesh based on the road length data, for example. The calculation unit 194 regards the extension of roads as the extension of water and sewage piping.

Among meshes in the first zone, the calculation unit 194 extracts a mesh for which the extension of water and sewage piping is greater than the critical distance $L_1$ between houses. The calculation unit 194 calculates the reduction in cost achieved by introduction of the distributed infrastructure in the mesh for which the extension of water and sewage piping is greater than the critical distance $L_1$ between houses.

In calculation of the cost, for example, an expected average number of houses in the mesh and the in-house extension of the water supply and sewerage systems per household are considered. In calculation of the cost, furthermore, the construction cost of the piping and the operation and maintenance cost of the piping are considered, for example. In this regard, the construction cost of the piping and the operation and maintenance cost of the piping may be a cost per year on the assumption that the amortization period is set to a predetermined number of years. Furthermore, the inner diameter of the piping to be installed or the like may also be considered.

Among meshes in the second zone, the calculation unit 194 extracts a mesh for which the extension of water piping is greater than the critical distance $L_2$ between houses. The calculation unit 194 calculates the reduction in cost achieved by introduction of the distributed infrastructure in the mesh for which the extension of water piping is greater than the critical distance $L_2$ between houses.

In calculation of the cost, for example, an expected average number of houses in the mesh and the in-house extension of the water supply system per household are considered. In calculation of the cost, furthermore, the construction cost of the piping and the operation and maintenance cost of the piping are considered, for example. In this regard, the construction cost of the piping and the operation and maintenance cost of the piping may be a cost per year on the assumption that the amortization period is set to a predetermined number of years. Furthermore, the inner diameter of the piping to be installed or the like may also be considered.

Among meshes in the third zone, the calculation unit 194 extracts a mesh for which the extension of water piping is greater than the critical distance $L_2$ between houses. The calculation unit 194 calculates the reduction in cost achieved by introduction of the distributed infrastructure in the mesh for which the extension of water piping is greater than the critical distance $L_2$ between houses in the same manner as the meshes in the second zone.

In step S14, the information processing apparatus 10 presents the simulation result to the user. Specifically, the controller 190 makes the presentation control unit 195 display the simulation result of the cost advantage on the display 141, for example. More specifically, the presentation control unit 195 displays the target area on the display 141 in such a manner that the reduction in cost calculated for each mesh can be discerned.

Figure 7:
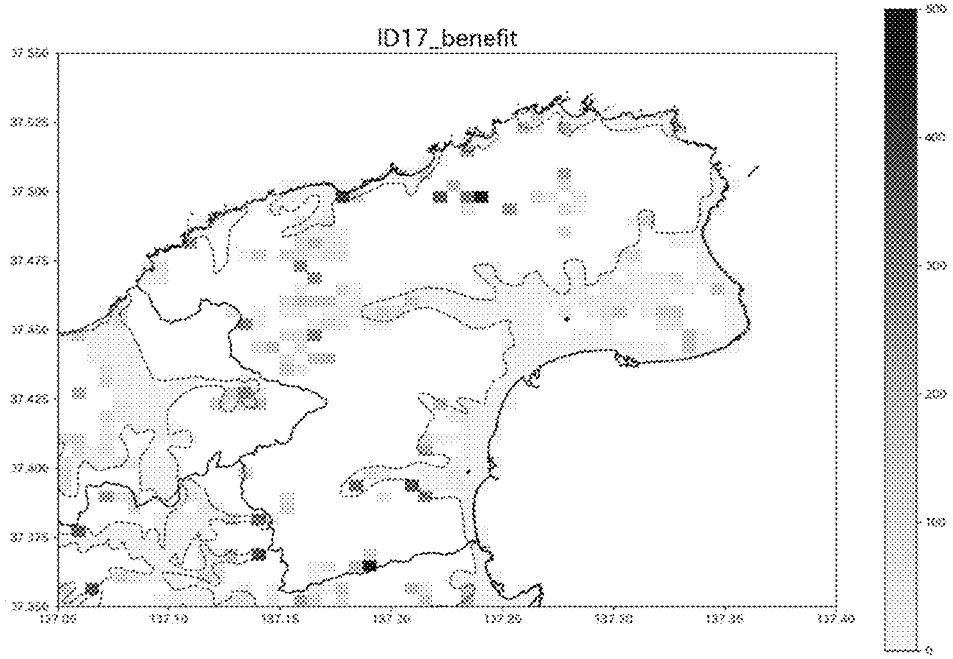
FIG. 7 is a diagram showing a result of simulation of a cost advantage achieved by introduction of a distributed infrastructure.

FIG. 7 is a diagram showing a result of simulation of the cost advantage achieved by introduction of the distributed infrastructure. FIG. 7 shows a result of simulation conducted for Suzu city of Ishikawa prefecture. In FIG. 7, the calculation unit 194 simulates a case where k=2, that is, the cost of the distributed infrastructure is twice the cost of a water purification tank. In FIG. 7, regions where the cost advantage is obtained mainly exist in mountainous areas.

Furthermore, the presentation control unit 195 displays the estimation result for zones on the display 141 in such a manner that each zone can be discerned. Furthermore, the presentation control unit 195 displays the target area on the display 141 in such a manner that the first state, the second state, the state A, the state B and combinations of at least two of these can be discerned.

As described above, in this embodiment, the controller 190 makes the estimation unit 193 divide the target area into meshes of a predetermined order. The estimation unit 193 calculates the population density of each mesh based on the population data. The estimation unit 193 obtains the sewerage penetration rate of the target area. The estimation unit 193 sets the meshes to the first state and resets meshes to the second state in descending order of the calculated population density until the ratio of the number of the meshes in the second state to the total number of meshes reaches the sewerage penetration rate. The estimation unit 193 estimates the presence/absence of a sewerage service in the mesh based on the first state and the second state. In this way, the information processing apparatus 10 can estimate a zone where there is a sewerage service in the target area based on published information. Therefore, the presence/absence of a sewerage service in the target area can be estimated without complicated processing.

Therefore, the information processing apparatus 10 according to this embodiment can estimate the waterworks environment based on published information with reduced processing load.

Furthermore, in this embodiment, the estimation unit 193 obtains information about the water supply zone of the water supply facility in the target area. The estimation unit 193 sets a mesh that does not correspond to the water supply zone to the state A, and sets a mesh that corresponds to the water supply zone to the state B. Based on the state A and the state B, the estimation unit 193 determines the presence/absence of a water supply service in the mesh. The estimation unit 193 classifies the water supply and sewerage environment into at least any of four types of zones based on the first state, the second state, the state A and the state B. In this way, the information processing apparatus 10 can estimate zones by considering the presence/absence of a water supply service.

Furthermore, in this embodiment, the calculation unit 194 calculates the reduction in cost achieved by introduction of the distributed infrastructure for each estimated zone, based on the expenses in the case where a house is incorporated into a service section and the expenses in the case where a house is not incorporated in the service section and the distributed infrastructure is used. In this way, the information processing apparatus 10 can performs a calculation appropriate for the estimated zone, and can correctly simulate the cost.

Furthermore, in this embodiment, the calculation unit 194 calculates the critical distance between houses based on the expenses in the case where a house is incorporated in a service section and the expenses in the case where a house is not incorporated into a service section and the distributed infrastructure is used. Based on the difference between the estimated extension of piping in the mesh and the critical distance, the calculation unit 194 calculates the reduction in cost achieved by using the distributed infrastructure. In this way, the information processing apparatus 10 can correctly simulate the cost with reduced processing load.

Furthermore, in this embodiment, the calculation unit 194 calculates the reduction in cost achieved by introduction of the distributed infrastructure for each estimated zone, based on the expenses in the case where a plurality of houses are incorporated in a service section and the expenses in the case where a plurality of houses are not incorporated into a service section and the distributed infrastructure is used and shared by the houses. In this way, the information processing apparatus 10 can correctly simulate the reduction in cost in the case where the distributed infrastructure is shared by a plurality of houses.

Furthermore, in this embodiment, the calculation unit 194 calculates the critical distance between houses based on the expenses in the case where a plurality of houses are incorporated in a service section and the expenses in the case where a plurality of houses are not incorporated into a service section and the distributed infrastructure is used and shared by the houses. Based on the difference between the estimated extension of piping in the mesh and the critical distance, the calculation unit 194 calculates the reduction in cost achieved by using the distributed infrastructure. In this way, the information processing apparatus 10 can correctly simulate the reduction in cost in the case where the distributed infrastructure is shared by a plurality of houses, with reduced processing load.

Furthermore, in this embodiment, the presentation control unit 195 displays the target area in such a manner that the first state, the second state, the state A, the state B, the classified zones and combinations of at least two of these can be discerned. In this way, the user can grasp the distribution of zones in the target area. The user can also grasp the water supply and sewerage environment of the target area.

Furthermore, in this embodiment, the calculation unit 194 calculates the cost for some or all of the meshes in the target area. The presentation control unit 195 displays the target area in such a manner that the costs calculated for the meshes can be discerned. In this way, the user can grasp the cost distribution in the target area, and can grasp areas to which the distributed infrastructure should be introduced.

<Variations>

In this embodiment, as described above, the controller 190 makes the estimation unit 193 calculate the population density in the mesh based on the population data published by Ministry of Land, Infrastructure, Transport and Tourism. The estimation unit 193 may correct the published population based on position information obtained by the terminal device 20. Specifically, the server 30 estimates the population in the mesh based on the position information obtained by the terminal device 20 (a personal computer, a cellular phone or a car navigation or other information terminal). The estimation unit 193 corrects the published population based on the population estimated by the server 30. The estimation unit 193 calculates the population density in the mesh based on the corrected population. In this way, the population density can be more accurately calculated, although the processing load increases.

Furthermore, in this embodiment, a case where the population data is based on published data has been described. However, the population data is not limited to data based on published data. For example, the population data on the mesh may be estimated based on information obtained by the terminal device 20. For example, the server 30 or the information processing apparatus 10 estimates the population in the mesh at a particular time based on position information obtained by the terminal device 20.

Furthermore, in this embodiment, the population data is not limited to the population of residents. The area in the mesh may be an area where the population of people varies with time, such as a commercial area (such as an area including hospitals, enterprises and the like). Furthermore, the area in the mesh may be an area where the population of people varies with season of the year, such as a sightseeing area (such as an area including hotels, inns and the like). When the mesh is such an area, the information processing apparatus 10 calculates the population in the mesh by multiplying the obtained population data by a predetermined coefficient.

Furthermore, the mesh described above in which the population temporarily increases or decreases can be a target region where the distributed infrastructure is installed. This is because in the area where the population temporarily increases or decreases, the population may temporarily increase in a certain period of time, but installation of the water supply and sewerage facilities may still be unnecessary. The information processing apparatus 10 determines a mesh in which the population temporarily increases or decreases, for example. The information processing apparatus 10 determines a mesh to be a mesh in which the population temporarily increases or decreases when the variation in population of the mesh obtained in real time satisfies a predetermined requirement, for example. The information processing apparatus 10 may determine whether the area in a mesh is an area where the population temporarily increases or decreases, from information about registered business entities or information about buildings (tenants), for example. The information processing apparatus 10 performs the simulation of introduction of the distributed infrastructure for a mesh determined to be a mesh in which the population temporarily increases or decreases.

Furthermore, the population data on a mesh may be estimated from information about water supply and sewerage facilities. The information about water supply and sewerage facilities includes scales and treatment capacities of water and sewerage facilities and distances between the facilities, for example. For example, the server 30 or the information processing apparatus 10 estimates the amount of water required in the mesh based on the scales and treatment capacities of the water supply and sewerage facilities. The server 30 or the information processing apparatus 10 estimates the population in the mesh based on the estimated required amount of water.

Furthermore, in this embodiment, the population data is not limited to the current population. The population data may include an expected population estimated from the make-up and age of resident households, the trend of migration into and from the area and land development programs, for example.

Furthermore, in this embodiment, the state of penetration of water supply and sewerage facilities is estimated, and the introduction of the distributed infrastructure is simulated for each estimated state of penetration. However, when there is information indicating the state of penetration of water supply and sewerage facilities, the state of penetration of water supply and sewerage facilities does not need to be estimated. The information processing apparatus 10 can use the information indicating the state of penetration of water supply and sewerage facilities to simulate the introduction of the distributed infrastructure on a mesh basis.

Furthermore, in this embodiment, the controller 190 makes the calculation unit 194 calculate the extension of roads in the mesh based on road length data published by Ministry of Land, Infrastructure, Transport and Tourism. The calculation unit 194 may correct the calculated extension of roads based on driving information obtained by the terminal device 20. Specifically, the server 30 estimates roads in the mesh based on the driving information obtained by the terminal device 20. The calculation unit 194 calculates the extension of roads in the mesh based on the published road length data. The calculation unit 194 corrects the calculated extension of roads based on the roads estimated by the server 30. In this way, the extension of roads can be more accurately calculated, although the processing load increases.

Furthermore, in this embodiment, a case where the extension of roads is based on published data has been described. However, the extension of roads is not limited to that based on published data. For example, the extension of roads in the mesh may be estimated based on information obtained by the terminal device 20. For example, the server 30 or the information processing apparatus 10 estimates the extension of roads in the mesh based on driving information obtained by the terminal device 20.

Furthermore, in this embodiment, the operation and maintenance cost of the distributed infrastructure may be cheaper when a plurality of distributed infrastructures are built in the mesh. For example, the water circulation system involved with the distributed infrastructure has various modules and units. Therefore, the water circulation system requires maintenance by maintenance personnel at regular intervals. If a plurality of distributed infrastructures are built in the mesh, the distributed infrastructures can be maintained together by maintenance personnel, so that the man-hour involved with the maintenance can be reduced. Thus, the cost advantage can be simulated by considering the advantage of building a plurality of distributed infrastructures.

Furthermore, in this embodiment, a case where the information processing apparatus 10 has the estimation unit 193 and the calculation unit 194 has been described, for example. However, the server 30 may have the functions of the estimation unit 193 and the calculation unit 194. The information processing apparatus 10 issues, to the server 30, an instruction to estimate zones of the meshes in the target area. In response to the instruction, the server 30 estimates zones of the meshes in the target area. The information processing apparatus 10 issues, to the server 30, an instruction to simulate the cost advantage in the case where the existing infrastructure is substituted with a distributed infrastructure for water treatment. In response to this instruction, the server 30 simulates the cost advantage. The information processing apparatus 10 reads the estimation result or simulation result from the server 30 and displays the read information on the display 141.

<4. Basic Hardware Configuration of Computer>

Figure 8:
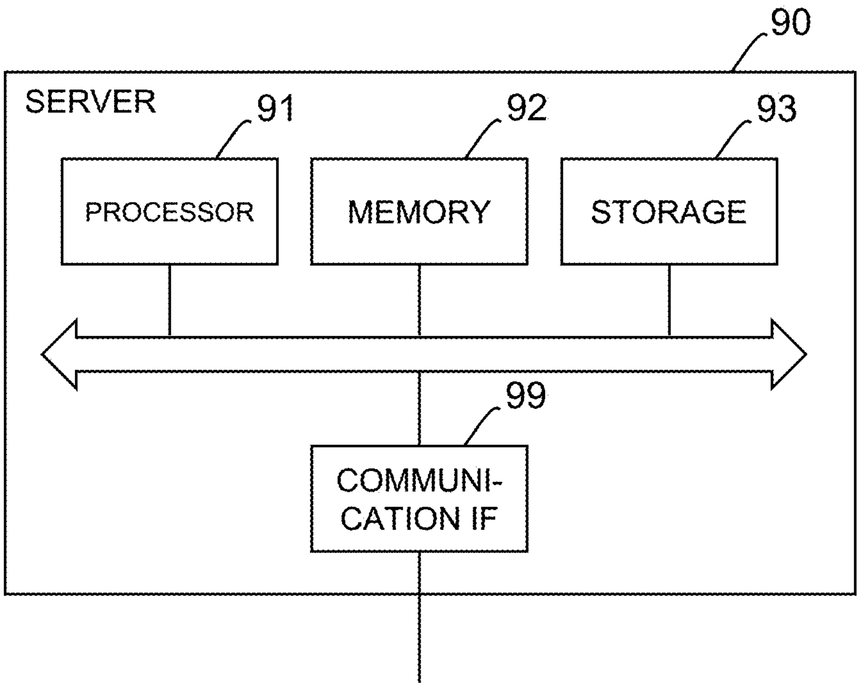
FIG. 8 is a block diagram showing a basic hardware configuration of a computer 90.

FIG. 8 is a block diagram showing a basic hardware configuration of a computer 90. The computer 90 at least includes processing circuitry 91, a main storage device 92, an auxiliary storage device 93 and a communication interface (IF) 99. These are electrically connected to each other by a bus.

The processing circuitry 91 is hardware that executes an instruction set described in a program. The processing circuitry 91 is formed by an arithmetic device, a register, a peripheral circuitry and the like.

The main storage device 92 temporarily stores a program and data to be processed by a program or the like, for example. For example, the main storage device 92 is a volatile memory, such as a dynamic random access memory (DRAM).

The auxiliary storage device 93 is a storage device that saves data and a program. For example, the auxiliary storage device 93 is a flash memory, a hard disk drive (HDD), a magneto-optical disk, a CD-ROM, a DVD-ROM or a semiconductor memory, for example.

The communication IF 99 is an interface for input and output of a signal communicated with another computer over a network according to a wired or wireless communication standard.

The network is formed by the Internet, a LAN, or a mobile communication system implemented by a radio base station or the like, for example. For example, the network may be a 3G, 4G or 5G mobile communication system, long term evolution (LTE), and a wireless network (such as Wi-Fi (registered trademark)) that can connect to the Internet via a predetermined access point. For wireless connection, the network includes Z-Wave (registered trademark), ZigBee (registered trademark) or Bluetooth (registered trademark) as a communication protocol, for example. For wired connection, the network may be a network to which the computer directly connects via a universal serial bus (USB) cable or the like.

Note that the computer 90 may be virtually implemented by providing some or all of the hardware components in a plurality of computers 90 in a distributed manner and connecting the components to each other over a network. That is, the computer 90 represents a concept including not only a computer 90 housed in a single housing or case but also a virtualized computer system.

<Basic Functional Configuration of Computer 90>

A functional configuration of the computer 90 having the basic hardware configuration shown in FIG. 8 will be described. The computer at least includes a controller, a storage unit and a communication unit as functional units.

Note that the functional units included in the computer 90 may be implemented by providing some or all of the functional units in a plurality of computers 90 connected to each other over a network in a distributed manner. The computer 90 represents a concept including not only a single computer 90 but also a virtualized computer system.

The controller is implemented by the processing circuitry 91 reading various programs stored in the auxiliary storage device 93, deploying the programs in the main storage device 92 and performing processing according to the programs. The controller can implement a functional unit that performs various information processing in accordance with the type of the program. In this way, the computer is implemented as an information processing apparatus that performs information processing.

The storage unit is implemented by the main storage device 92 and the auxiliary storage device 93. The storage unit stores data, various programs and various databases. The processing circuitry 91 can reserve a storage area corresponding to the storage unit in the main storage device 92 or the auxiliary storage device 93 according to a program. The controller can make the processing circuitry 91 perform addition, update and deletion processing of data stored in the storage unit according to various programs.

The "database" refers to a relational database, which manages data sets in a table format referred to as a table in association with each other, a data set in the table format being structurally defined by rows and columns. In the database, each of the tables is referred to as a table, each of the columns of the table is referred to as a column, and each of the rows of the table is referred to as a record. In the relational database, a relation between tables can be set to associate the tables with each other.

Typically, a column that serves as a key to uniquely identify a record is set in each table. However, setting a column as a key is not essential. The controller can make the processing circuitry 91 perform addition, deletion and update of a record of a particular table stored in the storage unit according to various programs.

The communication unit is implemented by the communication IF 99. The communication unit implements a function of communicating with another computer 90 over a network. The communication unit can receive information transmitted from another computer 90 and input the information to the controller. The controller can make the processing circuitry 91 perform information processing on the received information according to various programs. The communication unit can also transmit information output from the controller to another computer 90.

Although some embodiments of the present disclosure have been described above, these embodiments can be implemented in various other forms, and various omissions, replacements and modifications are possible without departing from the spirit of the present invention. These embodiments and variations thereof are included in the scope and spirit of the present invention, and included in the scope of the inventions described in the claims and equivalents thereof.

SUPPLEMENTS

Items described in each of the above embodiments will be supplementally described below.

Supplement 1

An information processing apparatus comprising processing circuitry configured to: divide a target area into meshes of a predetermined order; calculate a population density on a mesh basis based on population data; obtain a sewerage penetration rate of the target area; set the meshes to a first state and then reset meshes to a second state in descending order of the calculated population density until a ratio of a number of meshes in the second state to a total number of meshes reaches the sewerage penetration rate; and estimate a presence/absence of a sewerage service in a mesh based on the first state and the second state.

Supplement 2

The information processing apparatus according to (Supplement 1), wherein the processing circuitry is configured to: obtain information about a water supply zone of a water supply facility in the target area; set a mesh that does not correspond to the water supply zone to a state A and set a mesh that corresponds to the water supply zone to a state B; determine a presence/absence of a water supply facility in a mesh based on the state A and the state B; and classify a water supply and sewerage environment into at least any of four types of zones based on the first state, the second state, the state A and the state B.

Supplement 3

The information processing apparatus according to (Supplement 2), wherein the processing circuitry is configured to: a step of calculating, on a zone basis, first expenses in a case where a house is connected to an existing infrastructure in the zone according to a demand for water and second expenses in a case where the house is not connected to the existing infrastructure and a distributed infrastructure is used.

Supplement 4

The information processing apparatus according to (Supplement 3), wherein the processing circuitry is configured to: calculate a critical distance between houses based on the first expenses and the second expenses; and calculate a reduction in cost achieved by using the distributed infrastructure based on a difference between an extension of piping estimated in the mesh and the critical distance.

Supplement 5

The information processing apparatus according to (Supplement 2), wherein the processing circuitry is configured to: calculate, on a zone basis, first expenses in a case where a plurality of houses are connected to an existing infrastructure in the zone according to a demand for water and second expenses in a case where the plurality of houses are not connected to the existing infrastructure and a distributed infrastructure is used and shared by the houses.

Supplement 6

The information processing apparatus according to (Supplement 5), wherein the processing circuitry is configured to: calculate a critical distance between houses based on the first expenses and the second expenses; and calculate a reduction in cost achieved by using the distributed infrastructure based on a difference between an extension of piping estimated in the mesh and the critical distance.

Supplement 7

The information processing apparatus according to (Supplement 2), wherein the processing circuitry is configured to: display the target area in such a manner that the first state, the second state, the state A, the state B, the classified zones, or a combination of at least two of these is discernible.

Supplement 8

The information processing apparatus according to (Supplement 4), wherein the processing circuitry is configured to: calculate the reduction in cost, the reduction in cost is calculated for at least some of the meshes in the target area, and display the target area in such a manner that the reduction in cost calculated for the meshes is discernible.

Supplement 9

The information processing apparatus according to (Supplement 4), wherein the processing circuitry is configured to: extract a mesh for which the extension of piping is greater than the critical distance between houses; and calculate the reduction in cost achieved by introduction of the distributed infrastructure in the mesh for which the extension of piping is greater than the critical distance between houses.

Supplement 10

The information processing apparatus according to (Supplement 9), wherein the processing circuitry is configured to calculate the reduction in cost by considering an expected average number of houses in the mesh and the in-house extension per household.

Supplement 11

The information processing apparatus according to (Supplement 9), wherein the processing circuitry is configured to calculate the reduction in cost by considering the construction cost of the piping and the operation and maintenance cost of the piping.

Supplement 12

The information processing apparatus according to (Supplement 9), wherein the processing circuitry is configured to calculate the reduction in cost by considering the inner diameter of the piping to be installed.

Supplement 13

A method executed by a computer comprising processing circuitry and a memory, wherein the processing circuitry executes: dividing a target area into meshes of a predetermined order; calculating a population density on a mesh basis based on population data; obtaining a sewerage penetration rate of the target area; setting the meshes to a first state and then resetting meshes to a second state in descending order of the calculated population density until a ratio of a number of meshes in the second state to a total number of meshes reaches the sewerage penetration rate; and estimating a presence/absence of a sewerage service in a mesh based on the first state and the second state.

Supplement 14

A system comprising processing circuitry configured to: divide a target area into meshes of a predetermined order; calculate a population density on a mesh basis based on population data; obtain a sewerage penetration rate of the target area; set the meshes to a first state and then reset meshes to a second state in descending order of the calculated population density until a ratio of a number of meshes in the second state to a total number of meshes reaches the sewerage penetration rate; and estimate a presence/absence of a sewerage service in a mesh based on the first state and the second state.

The invention claimed is:

1. An information processing apparatus comprising processing circuitry configured to:
divide a target area into meshes of a predetermined order;
calculate a population density on a mesh basis based on population data;
obtain a sewerage penetration rate of the target area;
set the meshes to a first state and then reset meshes to a second state in descending order of the calculated population density until a ratio of a number of meshes in the second state to a total number of meshes reaches the sewerage penetration rate;
estimate a presence/absence of a sewerage service in a mesh based on the first state and the second state;
calculate a critical distance between houses based on first expenses for an existing infrastructure and second expenses for a distributed infrastructure;
calculate a reduction in cost based on a difference between an extension of piping estimated in the mesh and the critical distance; and
generate an optimization map to discern regions where the cost advantage is obtained, and display the target area reflecting the optimization map on a display.

2. The information processing apparatus according to claim 1, wherein the processing circuitry is configured to:
obtain information about a water supply zone of a water supply facility in the target area;
set a mesh that does not correspond to the water supply zone to a state A and set a mesh that corresponds to the water supply zone to a state B;
determine a presence/absence of a water supply facility in a mesh based on the state A and the state B; and
classify a water supply and sewerage environment into at least any of four types of zones based on the first state, the second state, the state A and the state B.

3. The information processing apparatus according to claim 2, wherein the processing circuitry is configured to: calculate, on a zone basis, first expenses in a case where a house is connected to an existing infrastructure in the zone according to a demand for water and second expenses in a case where the house is not connected to the existing infrastructure and a distributed infrastructure is used.

4. The information processing apparatus according to claim 3, wherein the processing circuitry is configured to:
calculate a critical distance between houses based on the first expenses and the second expenses; and
calculate a reduction in cost achieved by using the distributed infrastructure based on a difference between an extension of piping estimated in the mesh and the critical distance.

5. The information processing apparatus according to claim 4, wherein the processing circuitry is configured to:
extract a mesh for which the extension of piping is greater than the critical distance between houses; and
calculate the reduction in cost achieved by introduction of the distributed infrastructure in the mesh for which the extension of piping is greater than the critical distance between houses.

6. The information processing apparatus according to claim 5, wherein the processing circuitry is configured to calculate the reduction in cost by considering an expected average number of houses in the mesh and the in-house extension per household.

7. The information processing apparatus according to claim 5, wherein the processing circuitry is configured to calculate the reduction in cost by considering the construction cost of the piping and the operation and maintenance cost of the piping.

8. The information processing apparatus according to claim 5, wherein the processing circuitry is configured to calculate the reduction in cost by considering the inner diameter of the piping to be installed.

9. The information processing apparatus according to claim 4, wherein the processing circuitry is configured to:
- calculate the reduction in cost, the reduction in cost is calculated for some or all of the meshes in the target area, and
- display the target area in such a manner that the reduction in cost calculated for the meshes is discernible.

10. The information processing apparatus according to claim 2, wherein the processing circuitry is configured to: calculate, on a zone basis, first expenses in a case where a plurality of houses are connected to an existing infrastructure in the zone according to a demand for water and second expenses in a case where the plurality of houses are not connected to the existing infrastructure and a distributed infrastructure is used and shared by the houses.

11. The information processing apparatus according to claim 10, wherein the processing circuitry is configured to:
- calculate a critical distance between houses based on the first expenses and the second expenses; and
- calculate a reduction in cost achieved by using the distributed infrastructure based on a difference between an extension of piping estimated in the mesh and the critical distance.

12. The information processing apparatus according to claim 2, wherein the processing circuitry is configured to: display the target area in such a manner that the first state, the second state, the state A, the state B, the classified zones, or a combination of at least two of these is discernible.

13. A method executed by a computer comprising processing circuitry and a memory, wherein the processing circuitry executes:
- dividing a target area into meshes of a predetermined order;
- calculating a population density on a mesh basis based on population data;
- obtaining a sewerage penetration rate of the target area;
- setting the meshes to a first state and then resetting meshes to a second state in descending order of the calculated population density until a ratio of a number of meshes in the second state to a total number of meshes reaches the sewerage penetration rate; and
- estimating a presence/absence of a sewerage service in a mesh based on the first state and the second state;
- calculating a critical distance between houses based on first expenses for an existing infrastructure and second expenses for a distributed infrastructure;
- calculating a reduction in cost based on a difference between an extension of piping estimated in the mesh and the critical distance; and
- generating an optimization map to discern regions where the cost advantage is obtained, and display the target area reflecting the optimization map on a display.

14. A system comprising processing circuitry configured to:
- divide a target area into meshes of a predetermined order;
- calculate a population density on a mesh basis based on population data;
- obtain a sewerage penetration rate of the target area;
- set the meshes to a first state and then reset meshes to a second state in descending order of the calculated population density until a ratio of a number of meshes in the second state to a total number of meshes reaches the sewerage penetration rate; and
- estimate a presence/absence of a sewerage service in a mesh based on the first state and the second state;
- calculate a critical distance between houses based on first expenses for an existing infrastructure and second expenses for a distributed infrastructure;
- calculate a reduction in cost based on a difference between an extension of piping estimated in the mesh and the critical distance; and
- generate an optimization map to discern regions where the cost advantage is obtained, and display the target area reflecting the optimization map on a display.

* * * * *